United States Patent [19]

Haartsen

[11] Patent Number: 5,732,353
[45] Date of Patent: Mar. 24, 1998

[54] AUTOMATIC CONTROL CHANNEL PLANNING IN ADAPTIVE CHANNEL ALLOCATION SYSTEMS

[75] Inventor: Jacobus Cornelis Haartsen, Skåne, Sweden

[73] Assignee: Ericsson Inc., Research Trianlge Park, N.C.

[21] Appl. No.: 418,683

[22] Filed: Apr. 7, 1995

[51] Int. Cl.⁶ .................................................. H04Q 7/20
[52] U.S. Cl. ..................... 455/450; 455/446; 455/452
[58] Field of Search ................................ 455/33.1, 54.1, 455/32.1, 33.2, 56.1, 58.2, 450, 453, 451, 418, 460, 448

[56] References Cited

U.S. PATENT DOCUMENTS

| | | | |
|---|---|---|---|
| 4,485,486 | 11/1984 | Webb et al. | 455/33 |
| 4,551,852 | 11/1985 | Gruel | 455/33 |
| 4,750,198 | 6/1988 | Harper | 379/59 |
| 4,866,710 | 9/1989 | Schaeffer | 370/95.1 |
| 5,038,399 | 8/1991 | Bruckert | 455/33 |
| 5,056,109 | 10/1991 | Gilhousen et al. | 375/1 |
| 5,109,528 | 4/1992 | Uddfeldt | 455/33.2 |
| 5,123,110 | 6/1992 | Grube | 455/33.1 |
| 5,157,709 | 10/1992 | Ohteru | 379/58 |
| 5,175,867 | 12/1992 | Wejke et al. | 455/33.1 |
| 5,185,739 | 2/1993 | Spear | 370/95.3 |
| 5,203,012 | 4/1993 | Patsiokas et al. | 455/34.1 |
| 5,218,630 | 6/1993 | Patsiokas et al. | 379/58 |
| 5,230,082 | 7/1993 | Ghisler et al. | 455/33.2 |
| 5,239,676 | 8/1993 | Strawczynski et al. | 455/33.2 |
| 5,239,678 | 8/1993 | Grube et al. | 455/34.1 |
| 5,247,699 | 9/1993 | Hartman | 455/33.1 |
| 5,276,908 | 1/1994 | Koohgoli et al. | 455/34.1 |
| 5,309,503 | 5/1994 | Bruckert et al. | 379/60 |
| 5,363,428 | 11/1994 | Nagashima | 379/58 |
| 5,369,783 | 11/1994 | Childress et al. | 455/17 |

FOREIGN PATENT DOCUMENTS

| | | |
|---|---|---|
| 411 878 | 2/1991 | European Pat. Off. . |
| 0 431 956 | 6/1991 | European Pat. Off. . |
| 458158 | 11/1991 | European Pat. Off. . |
| 0 513 841 | 11/1992 | European Pat. Off. . |
| 529859 | 3/1993 | European Pat. Off. . |
| 578 197 | 1/1994 | European Pat. Off. . |
| 0 585 994 | 3/1994 | European Pat. Off. . |
| 4-124920(A) | 4/1992 | Japan . |
| 6/284075 | 10/1994 | Japan . |
| 2 266 433 | 10/1993 | United Kingdom . |
| WO93/08655 | 4/1993 | WIPO . |

OTHER PUBLICATIONS

International Search Report of PCT/US96/04524 Date of mailing of Search Report: 13 Sep. 1996.

PCT International Search Report Date of Mailing: 18 Jul. 1995.

Conference Proceedings, "*Performance of Dynamic Channel Assignment Techniques in a Cellular Environment*", 25 Jun. 1992–26 Jun. 1992, pp. 340–343.

G. Falciasecca et al., "Investigation on a Dynamic Channel Allocation for High Capacity Mobile Radio Systems" *38th Vehicular Technology Conference*, pp. 176–181, Jun. 1988.

Blecher, *Advanced Mobile Phone Service*, IEEE Transactions on Vehicular Technology, vol. VT29, No. 2, May, 1980, pp. 238–244.

(List continued on next page.)

*Primary Examiner*—Edward F. Urban
*Assistant Examiner*—Darnell R. Armstrong
*Attorney, Agent, or Firm*—Burns, Doane, Swecker & Mathis, L.L.P.

[57] ABSTRACT

Methods and systems for allocating control channels in a radiocommunication system are disclosed. Control channels are each linked to a dedicated traffic channels such that when the dedicated traffic channel is allocated to a particular cell, so is its respective control channel. Implementation according to the present invention is independent of the particular ACA scheme used to determine traffic channel allocation.

14 Claims, 5 Drawing Sheets

OTHER PUBLICATIONS

Standard Search Report from the European Patent Office, mailed Oct. 10, 1995 issued in connection with a copending application of the assignee.

U.S. application Ser. No. 07/872,232, filed Apr. 22, 1992, by Kåkan O. Eriksson et al., entitled "Segregation Method of Dynamic Channel Allocation in a Mobile Radio System".

U.S. application Ser. No. 08/114,347, filed Sep. 1, 1993, by Roland Bodin et al., entitled "Channel Selection in a Cellular Communication System".

U.S. application Ser. No. 08/207,032, filed Mar. 7, 1994, by Jacobus C. Haartsen, entitled "Method and System for Channel Allocation Using Power Control and Mobile-Assisted Handover Measurements".

U.S. application Ser. No. 08/253,699, filed Jun. 3, 1994, by Magnus E. Madfors et al., entitled "Adaptive Frequency Allocation for Broadcast Control Channels".

U.S. application Ser. No. 08/406,591, filed Mar. 20, 1995, by Knut M. Almgren et al., entitled "Adaptive Channel Allocation in a Mobile Communications System".

U.S. application Ser. No. 08/418,682, filed Apr. 7, 1995, by Jacobus C. Haartsen, entitled "Stabilized Control Channel Planning Using Loosely Coupled Dedicated Traffic Channels".

U.S. application Ser. No. 08/418,684, filed Apr. 7, 1995, by Knut M. Almgren et al., entitled "Dynamic Allocation of Channels in a Celluar Telephone System".

M. Almgren et al., "Capacity Enhancements in a TDMA System", *VTC '93*, 1993.

H. Andersson et al., "Adaptive Channel Allocation in a TIA IS-54 System," *42nd IEEE Veh. Tech. Conf.*, pp. 778–781, Denver, 1992.

R. Beck & H. Panzer, "Strategies for Handover and Dynamic Channel Allocation in Micro-Cellular Mobile Radio Systems," *39th IEEE Vehicular Technology Conf.*, pp. 178–185, 1989.

R.C. Bernhardt, "Call Performance in a Frequency Reuse Digital Portable Radio System," *IEEE Transactions on Vehicular Technology*, pp. 777–785, vol. 40, No. 4, Nov. 1991.

R.C. Bernhardt, "Time-Slot Management in Frequency Reuse Digital Portable Radio Systems," *Proc. of Veh. Tech. Conf.*, 282–286, 1990.

J. C.-I. Chuang, "Autonomous Adaptive Frequency Assignment for TDMA Portable Radio Systems," *IEEE Transactions on Vehicular Technology*, pp. 627–635, vol. 40, No. 3, Aug. 1991.

J. C.-I. Chuang, "Autonomous Frequency Assignment and Access for TDMA Personal Portable Radio Communications," *41st IEEE Vehicular Technology Conf.*, pp. 699–703, St. Louis, May 1991.

J.C.-I. Chuang, "Performance Issues and Algorithms for Dynamic Channel Assignment," *Proc. IEEE GlobeCom '92*, pp. 1419–2424, Orlando, 1992.

D.C. Cox & D.O. Reudink, "Increasing Chanel Occupancy in Large-Scale Mobile Radio Systems: Dynamic Channel REassignment," *IEEE Transactions on Communications*, pp. 1302–1306, vol. COM-21, No. 11, Nov. 1973.

M. Duque-Antón et al., "Channel Asssignment for Cellular Radio Using Simulated Annealing," *IEEE Transactions on Vehicular Technolgy*, pp. 14–21, vol. 42, No. 1, Feb. 1993.

H. Eriksson, "Capacity Improvement by Adaptive Channel Allocation," *IEEE Global Telecom. Conference*, pp. 1355–1359, Nov. 28–Dec. 1, 1988.

H. Eriksson & R. Bownds, "Performance of Dynamic Channel Allocation in the DECT System," *41st IEEE Vehicular Technology Conf.* pp. 693–698, St. Louis, May 1991.

D. Everitt & D. Manfield, "Performance Analysis of Cellular Mobile Communication Systems with Dynamic Channel Assignment," *IEEE Journal on Selected Areas in Communications*, pp. 1172–1180, vol. 7, No. 8, Oct. 1989.

G. Falciasecca et al., "On the Impact of Traffic Burst on Performances on High Capacity Cellular Systems," *Proc. of Veh. Tech. Conf.*, pp. 646–651, 1990.

M. Frodigh, "Reuse-Partitioning Combined with Traffic Adaptive Channel Assignment for Highway Microcellular Radio Systems," *Proc. IEEE GlobeCom'92*, pp. 1414–1418, Atlanta, 1992.

Y. Furuya & Y. Akaiwa, "Channel Segregation, A Distributed Adaptive Channel Allocation Scheme for Mobile Communiaction Systems," *Second Nordic Seminar on Digital Land Mobile Radio Communications*, pp. 311–315, Stockholm, Oct. 14–16, 1986.

A. Gamst, "Some Lower Bounds for a Class of Frequency Assignment Problems," *IEEE Transactions on Vehicular Technology*, pp. 8–14, vol. VT-35, No. 1, Feb. 1986.

T. Kanai, "Autonmous Reuse Partitioning in Cellular Systems," *42nd IEEE Veh. Tech. Conf.*, 782–785, Denver 1992.

D. Kunz, "Practical Channel Assignment Using Neural Networks," *VTC '90*, pp. 652–655, 1990.

R.W. Nettleton & G.R. Schloemer, "a High Capacity Assignment Method for Cellular Mobile Telephone Systems," *Proc. of Veh. Tech. Conf.*, pp. 359–367, San Francisco, May 1–3, 1989.

R.W. Nettleton, "Traffic Statistic in a Self-Organizing Cellular Telephone System," *Proc. of Veh. Tech. Conf.*, pp. 305–310, 1990.

S.-H. Oh & D.-W. Tcha, "Prioritized Channel Assignment in a Cellular Radio Network," *IEEE Transactions on Communications*, pp. 1259–1269, vol. 40, No. 7, Jul. 1992.

S. Onoe & S. Yasuda, "Flexible Re-use for Dynamic Channel Assignment in Mobile Radio Systems," *IEEE ICC'89*, pp. 472–476, Jun. 1989.

H. Panzer & R. Beck, "Adaptive Resource Allocation in Metropolitan Area Cellular Mobile Radio Systems," *Proc. of Veh. Tech. Conf.*, pp. 638–645, 1990.

G. Riva, "Performance Analysis of an Improved Dynamic Channel Allocation Sceme for Cellular Mobile Radio Systems,"*42nd IEEE Veh. Tech. Conf.*, pp. 94–797, Denver, 1992.

A.N. Rosenberg, "Simulation of Power Control and Voice-Channel Selection in Cellular Systems," *Proc. IEEE VTC'85*, pp. 12–15, 1985.

K. Sallberg et al., "Hybrid Channel Assignment and Reuse Partitioning in a Cellular Mobile Telephone System," *Proc. IEEE VTC '87*, pp. 405–411, 1987.

L.P. Shu & J.W. Chen, "Dynamic Grouping Algorithm for Cellular Communicatios Systems," *Proc. of Veh. Tech. Conf.*, pp. 689–692, 1991.

K.N. Sivarajan et al., "Channel Assignment in Cellular Radio," *Proc. of Veh. Tech. Conf. 1989*, pp. 846–850, 1989.

K.N. Sivarajan et al., "Dynamic Channel Assignment in Cellular Radio," *Proc. of Veh. Tech. Conf.*, pp. 631–637, 1990.

J. Tajima, "A Strategy for Flexible Channel Assignment in Mobile Communication Systems," *IEEE Transactions on Vehicular Technology*, pp. 92–103, vol. 37, No. 2, May 1988.

R.A. Valenzuela, "Dynamic Resource Allocation in Line-of-Sight Microcells," *IEEE Proc. GlobeCom'92*, pp. 1425-1430, Orlando, 1992.

S. Yasuda & S. Onoe, "Autonomous Channel Assignment Control for Flexible Reuse in Mobile Radio Systems," *Proc. of 42nd Veh. Tech. Conf.*, pp. 798-801, Denver, May 10-13, 1992.

J. Zander & M. Frodigh, "Capacity Allocation and Channel Assignment in Cellular Radio Systems Using Reuse Partitioning," *Electronics Letters*, pp. 438-440, vol. 28, No. 5, Feb. 27, 1992.

J. Zander, "Distributed Cochannel Interference Control in Cellular Radio Systems," *IEEE Transactions on Vehicular Technology*, pp. 305-311, 1992.

FIG. 1 (PRIOR ART)

| SYSTEM | BANDWIDTH (MHz) | NUMBER OF CHANNELS | BOUNDARY CHANNEL NUMBER | TRANSMITTER CENTER FREQUENCY (MHz) | |
| --- | --- | --- | --- | --- | --- |
| | | | | MOBILE | BASE |
| NOT USED | | 1 | | (824.010) | (869.010) |
| A" | 1 | 33 | 991<br>1023 | 824.040<br>825.000 | 869.040<br>870.000 |
| A | 10 | 333 | 1<br>333 | 825.030<br>834.990 | 870.030<br>879.990 |
| B | 10 | 333 | 334<br>666 | 835.020<br>844.980 | 880.020<br>889.980 |
| A' | 1.5 | 50 | 667<br>716 | 845.010<br>846.480 | 890.010<br>891.480 |
| B' | 1.5 | 83 | 717<br>799 | 846.510<br>848.970 | 891.510<br>893.970 |

| TRANSMITTER | CHANNEL NUMBER | CENTER FREQUENCY (MHz) |
| --- | --- | --- |
| MOBILE | $1 \leq N \leq 799$<br>$990 \leq N \leq 1023$ | $0.030 N + 825.000$<br>$0.030 (N - 1023) + 825.000$ |
| BASE | $1 \leq N \leq 799$<br>$990 \leq N \leq 1023$ | $0.030 N + 870.000$<br>$0.030 (N - 1023) + 870.000$ |

ORDINARY TRAFFIC CHANNELS

AUTOMATIC CONTROL CHANNEL PLANNING IN ADAPTIVE CHANNEL ALLOCATION SYSTEMS

RELATED APPLICATION

This application is related to U.S. patent application Ser. No. 08/418,682, entitled "Stabilized Control Channel Planning Using Loosely Coupled Dedicated Traffic Channels" and filed on an even date herewith.

BACKGROUND

The present invention relates generally to adaptive channel allocation in radiocommunication systems and more particularly to automatic control channel planning in systems which utilize adaptive channel allocation.

Various methods have been introduced to efficiently utilize the limited range of frequencies available for radio communications. One well-known example is frequency reuse, a technique whereby groups of frequencies are allocated for use in regions of limited geographic coverage known as cells. Cells containing the same groups of frequencies are geographically separated to allow callers in different cells to simultaneously use the same frequency without interfering with each other. By so doing many thousands of subscribers may be served by a system of only several hundred frequencies.

The design and operation of such a system is described in an article entitled Advanced Mobile Phone Service by Blecher, IEEE Transactions on Vehicular Technology, Vol. VT29, No. 2, May, 1980, pp. 238–244. Commonly known as the AMPS system, this system had allocated to it by the FCC a block of the UHF frequency spectrum further subdivided into pairs of narrow frequency bands called channels. At present there are 832, 30 kHz wide channels allocated to cellular mobile communications in the United States. A table of the frequencies dedicated to mobile communications in the U.S. is shown in FIG. 1. Of the 832 available channels, there are 21 control channels dedicated each to the A-carrier and the B-carrier. These 42 control channels provide system information and cannot be used for voice traffic. The remaining 790 channels, known as voice or traffic channels, carry the burden of voice or data communication.

Frequency planning is a process by which individual channels are assigned to cells within the network. Currently, most frequency planning is done a priori; that is a fixed frequency plan is "hard-wired" in place by each cellular system operator. This is known as fixed channel allocation, or FCA. However, as interference and traffic load are time varying, FCA has disadvantages with regard to system adaptability. For example, in microcells, picocells, and indoor cellular or PCS systems, the base stations are located so densely and the environment is so unpredictable and time-varying (e.g. opening a door changes the interference conditions), that channel planning becomes nearly impossible. Because of the time varying nature of the interference, therefore, an adaptive scheme can offer significant advantages in this regard.

Adaptive channel allocation, or ACA, is a method of dynamically allocating frequencies throughout a cellular system to increase system capacity and adaptability. Under an ACA scheme, more frequencies would be allocated to busy cells from more lightly loaded cells. In addition, the channels can be allocated such that all links have satisfactory quality. A common feature of ACA systems is that they allocate a channel out of a set of channels which fulfills some predetermined quality criteria. However, different ACA schemes select channels from the set based upon different criteria.

The concept of ACA is well-known to those skilled in the art, and its potential has been described in various publications. For example, "Capacity Improvement by Adaptive Channel Allocation", by Håkan Eriksson, IEEE Global Telecomm. Conf., Nov. 28–Dec. 1, 1988, pp. 1355–1359, illustrates the capacity gains associated with a cellular radio system where all of the channels are a common resource shared by all base stations. In the above-referenced report, the mobile measures the signal quality of the downlink, and channels are assigned on the basis of selecting the channel with the highest signal to interference ratio (C/I level).

Another approach is described by G. Riva, "Performance Analysis of an Improved Dynamic Channel Allocation Scheme for Cellular Mobile Radio Systems", 42nd IEEE Veh. Tech. Conf., Denver, 1992, pp. 794–797 where the channel is selected based on achieving a quality close to or slightly better than a required C/I threshold. Furuya Y. et al., "Channel Segregation, A Distributed Adaptive Channel Allocation Scheme for Mobile Communications Systems", Second Nordic Seminar on Digital Land Mobile Radio Communication, Stockholm, Oct. 14–16, 1986, pp. 311–315 describe an ACA system wherein the recent history of link quality is considered as a factor in allocation decisions. In addition several hybrid systems have been presented where ACA is applied to a small block of frequencies on top of an FCA scheme. Such an example is presented in Sailberg, K., et al., "Hybrid Channel Assignment and Reuse Partitioning in a Cellular Mobile Telephone System", Proc. IEEE VTC '87, 1987, pp. 405–411.

Apart from increases in system capacity, adaptive channel allocation obviates the need for system planning. Planning is instead performed by the system itself. This feature of ACA is particularly attractive when system changes are implemented, when new base stations are added, or when the environment changes, for example by the construction or demolition of large buildings.

The above described adaptive channel allocation schemes, however, have generally been utilized only in conjunction with the allocation of traffic channels, and not control channels. Thus, although each base station has access to all the traffic channels, the allocation of control channels has typically remained a fixed allocation in which each base station uses a certain predetermined control channel or channels. Since the control channels are not adaptively allocated, the operator has to plan these channels geographically, i.e., which base gets what control channel so as to minimize the amount of co-channel interference experienced on the control channels. Thus, the advantages of increased capacity and adaptability realized in ACA traffic channel allocation have generally not been achieved with respect to control channel allocation. Because control channels have been fixed to each base station, changes in control channel allocation have required costly system reconfiguration. However, only if both the traffic channels and the control channels are automatically allocated is the operator effectively relieved from planning the system.

A partial solution to the problems of fixed control channel allocation could be provided by a system which directly incorporated the allocation of control channels into a conventional ACA scheme. However, allocation of traffic channels in ACA routines is based on certain criteria such as interference, channel success rate, previous performance of the channel, etc., whereas criteria for measuring quality are quite different for control channels. For example, there is no success rate of previous performance for control channels since (1) a control channel cannot be allowed to be unsuccessful, and (2) the performance of different control channels cannot be compared because this would require alternatively using each of the control channels to get an average performance measure. The latter is not desirable, since control channel allocation should remain reasonably stable.

Another problem with incorporating control channels directly into a conventional ACA routine is that the transmission on control channels is bursty and irregular, particularly on the uplink from mobile to base, because the many mobile stations transmit control signals over a range of different distances and power levels. Consequently, measurements of these bursty control signals do not provide a reliable indication on which to base ACA decisions. Thus, the incorporation of control channels directly into a conventional ACA routine is not a desirable solution to the problem presented by the lack of a mechanism for adaptively allocating control channels.

There is a need in the industry, therefore, for a system and method of automatic control channel planning in ACA systems which provide reliability and system adaptability in the allocation of control channels.

SUMMARY

Accordingly, it is an object of the invention to provide a method and apparatus which enable a system using adaptive channel allocation (ACA) for allocating traffic or voice channels, to automatically plan the control channels as well. The method can allocate control channels using any existing ACA scheme, for example in the AMPS or ADC systems, currently used by an operator for traffic channel allocation.

According to exemplary embodiments of the invention, a radiocommunication system utilizes a block of control channels in the frequency spectrum to transmit control information between base and mobile stations. The system also utilizes a set of traffic channels to transmit information such as voice information between bases and mobiles. Each base in the cellular system has access to all the traffic channels and all the control channels. Included in the set of traffic channels is a block of dedicated traffic channels, each one of which is associated or coupled with a particular control channel in the block of control channels. The particular frequency pairing of each dedicated traffic channel and its associated control channel is the same wherever these frequencies are reused.

When one of the dedicated traffic channels is reallocated to another base station according to an ACA decision, the associated control channel is reallocated to the same base station. Because the frequency pairing is the same wherever the frequencies are reused, there is a high correlation between the quality in the coupled channels. Thus, by adaptively allocating the dedicated traffic channels to base stations using an ACA routine, the coupled control channels are adaptively allocated as well, without directly incorporating the control channels into an ACA routine.

The invention thus provides several advantages over prior radiocommunications systems. For example, both the traffic channels and the control channels are adaptively allocated to fully relieve an operator from system planning. The benefit of not having to fixedly associate control channels with base stations, and the resultant ability to adapt to slow changes in the environment, such as new buildings and large constructions, or changes in the infrastructure, for example the addition of more base stations in "hot spots", is of prime importance. This represents a significant advantage over systems which employ ACA on traffic channels only.

Another advantage of the invention is that it operates through the allocation of the traffic channels based on measurements of the traffic channels. These measurements are significantly more reliable and easy to determine than measurements of the control channels.

The invention also provides the ACA benefit that the system adapts to the traffic conditions. Peak traffic conditions can be accommodated by temporarily allocating more traffic channels in a restricted area. For control channels, this adaptation to non-uniform traffic is generally less of a concern. However, the present invention allows the usage of more than one control channel in a base when required by traffic conditions.

BRIEF DESCRIPTION OF THE DRAWINGS

The foregoing and other objects, features and advantages of the present invention will be more readily understood upon reading the following detailed description in conjunction with the drawings in which:

FIG. 1 is an illustration of the allocated frequency spectrum as per the U.S. standard IS-54B;

DETAILED DESCRIPTION

Before describing the details of the present invention, an example of the construction of a cellular mobile radio system in which the present invention can be utilized will be described. While the construction shown depicts a digital system, those skilled in the art will appreciate that it is also possible to implement the present invention on other types of systems such as analog or dual-mode systems.

Figure 2:
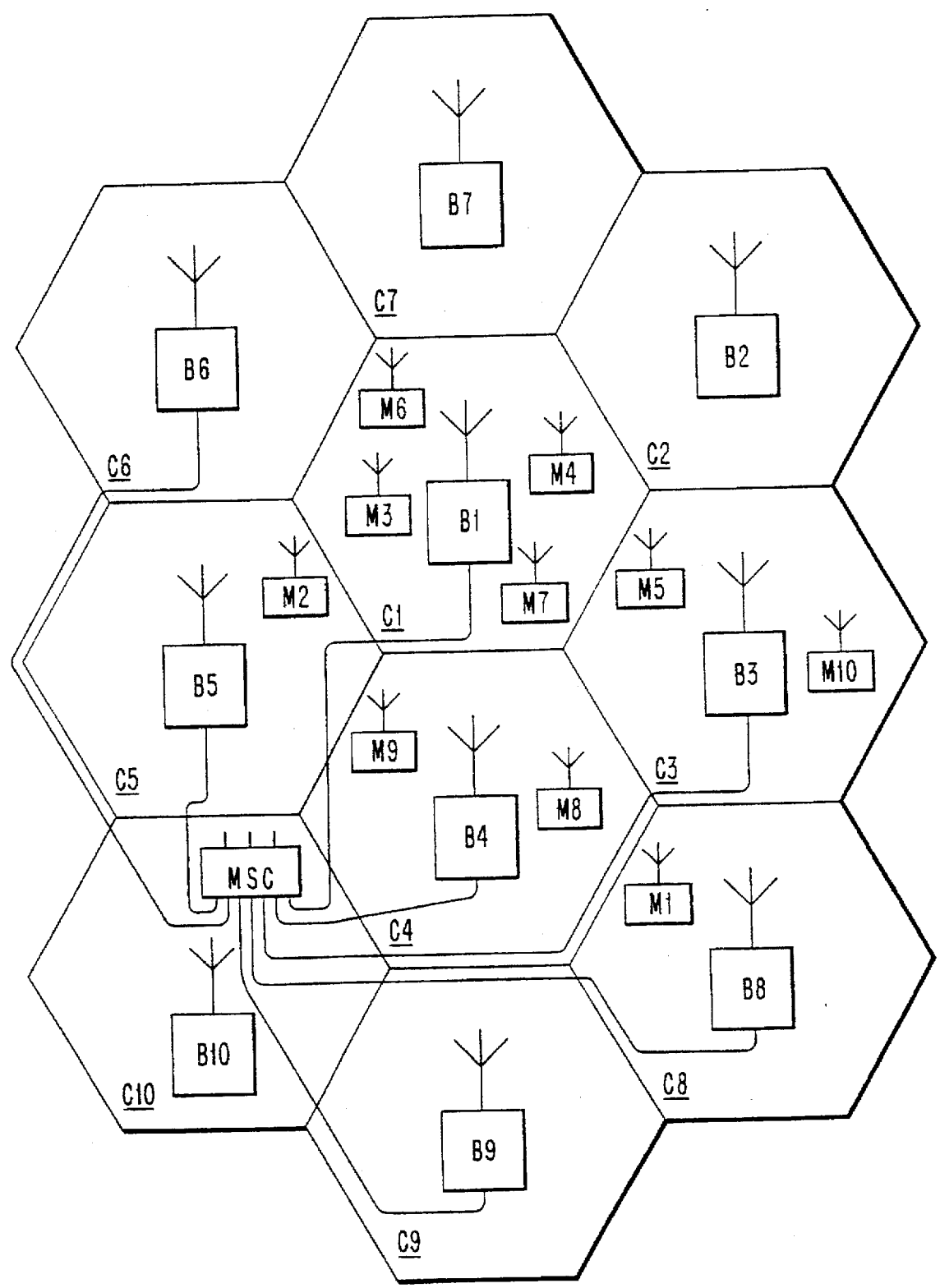
FIG. 2 is a diagram of an exemplary radiocommunication network.

FIG. 2 is a schematic diagram illustrating ten cells, C1 to C10, in a cellular mobile radio telephone system. Normally methods according to the present invention would be implemented in a cellular mobile radio system comprising many more cells than ten. For purposes of this discussion, the system depicted herein is considered to be an isolated portion of a larger system which has been fragmented.

For each cell C1 to C10, there is a respective base station B1 to B10. FIG. 2 illustrates base stations situated in the vicinity of cell centers and having omni-directional antennas. The base stations of adjacent cells may however be co-located in the vicinity of cell borders and have directional antennas.

Also illustrated in FIG. 2 are ten mobile stations M1 to M10, which are movable within a cell and from one cell to another cell. The method according to the present invention may be implemented in a cellular mobile radio system comprising many more mobile stations than ten. Normally, there are many more mobile stations than there are base stations.

A mobile switching center MSC as illustrated in FIG. 2 is connected to all ten illustrated base stations, for example by cables or other media such as fixed radio links. The mobile switching center is also connected by cables or other media to, for example, a public switching telephone network or similar fixed network with ISDN facilities. Not all connections from the mobile switching center to base stations and connections to the fixed network are illustrated in FIG. 2 to simplify the illustration.

Figure 3:
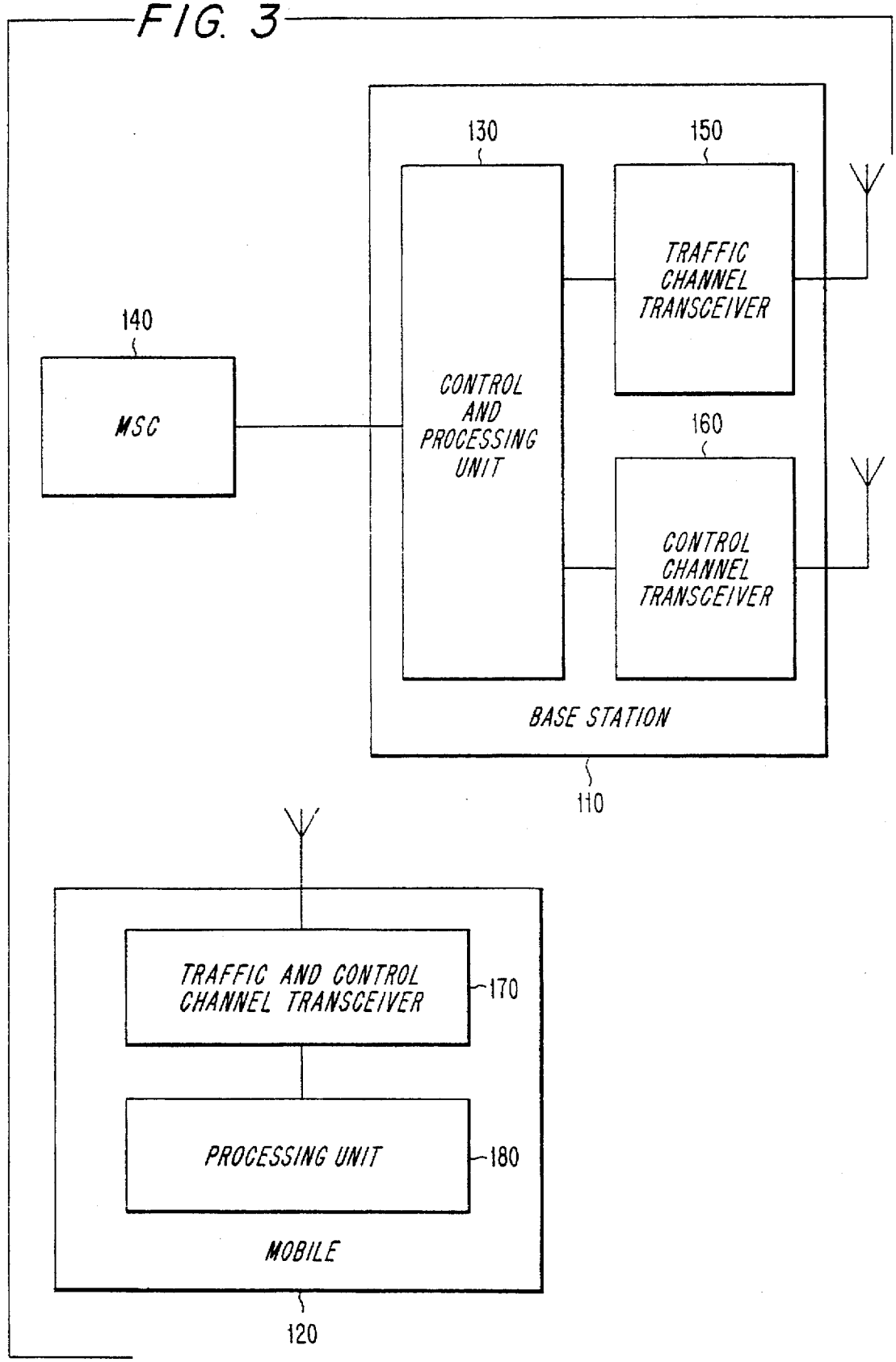
FIG. 3 is a schematic diagram of an exemplary base and mobile station.

An exemplary base station 110 and mobile 120 are illustrated in FIG. 3. The base station includes a control and processing unit 130 which is connected to the MSC 140 which in turn is connected to the public switched telephone network (not shown).

The base station 110 for a cell includes a plurality of traffic or voice channels handled by traffic channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The traffic channel transceiver broadcasts the traffic or voice channels which can also include digital control channel location information.

When the mobile 120 first enters idle mode, it periodically scans the control channels of base stations such as base station 110 to determine which cell to lock on to. The mobile 120 receives the absolute and relative information broadcast on a control channel at its traffic and control channel transceiver 170. Then, the processing unit 180 evaluates the received control channel information which includes the characteristics of the candidate cells and determines which cell the mobile should lock to. The received control channel information not only inches absolute information concerning the cell with which it is associated, but can also contain relative information concerning other cells proximate to the cell with which the control channel is associated. These adjacent cells are periodically scanned while monitoring the primary control channel to determine if there is a more suitable candidate.

Figure 4:
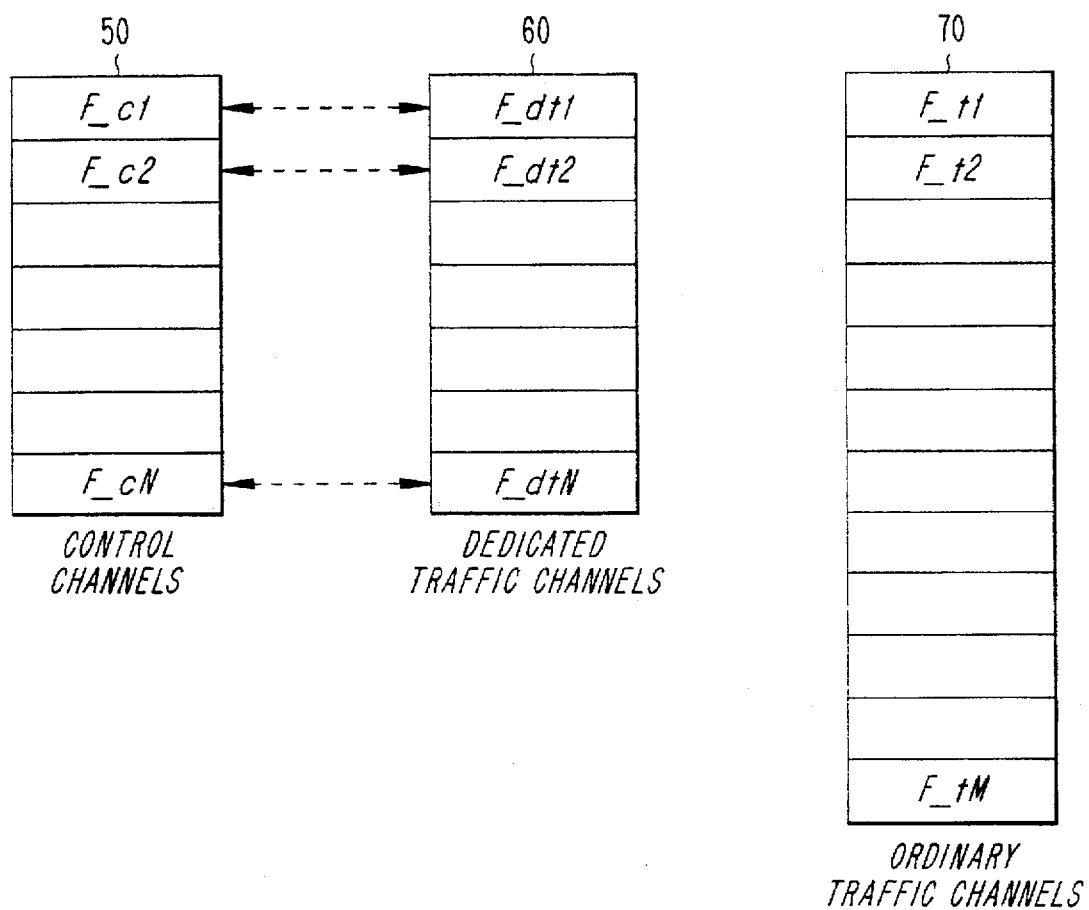
FIG. 4 is a diagram of traffic and control channels in a frequency spectrum according to an exemplary embodiment of the invention.

In the above described radiocommunication system, the frequency spectrum according to an exemplary embodiment of the invention is divided into two parts, one part for the control channels and one part for the traffic channels. FIG. 4 shows a set 50 of N control channels F_c1 to F_cN. Under the AMPS and IS-54 systems, for example, a block of 21 frequencies located in a dedicated part of the frequency spectrum can be set aside for control channels so that the mobiles know where in the frequency spectrum to scan for the control channels. According to other schemes, the control channels may be disposed on channels which are not adjacent to one another and may be located by mobile stations using a variety of mechanisms, e.g., by location information transmitted on traffic channels. Those skilled in the art will appreciate that the present invention is applicable to any system in which control channels are employed.

FIG. 4 also shows sets 60 and 70 of N+M channels used for traffic, including a set 60 of N dedicated traffic channels F_dt1 to F_dtN. For example, a 21-channel, dedicated traffic channel block 60 can be specified somewhere in the channel space, such as adjacent to block 50, although this particular arrangement is not required. Finally, FIG. 4 shows a set 70 of M ordinary traffic channels F_t1 to F_tM.

Unlike conventional systems, the control channels according to exemplary embodiments of the invention can be used by any base station, and no fixed allocation of control channels to base stations is performed a priori. Instead, each control channel is coupled to or associated with one of the dedicated-traffic channels, shown in FIG. 4, resulting in N pairs of control/dedicated-traffic channels, F_ci/F_dti, where i ranges from 1 to N. The method of frequency allocation as well as the division of frequencies used for control channels, dedicated traffic channels, and ordinary traffic channels can be the same in every base station in the cellular system. In addition, the particular frequency pairing of each dedicated traffic channel and its associated control channel can be the same in every base station in the system.

The traffic channels, including the dedicated traffic channels, can be incorporated directly into an ACA scheme, whereby they are allocated to base stations according to changing interference conditions, for example. The ACA scheme used for the traffic channels is preferably a distributed scheme, i.e., the ACA method uses local information and is carried out in the base stations or in the MSC. When a dedicated traffic channel, for example F_dt1, is re-allocated within block 60 because of an ACA optimization decision, the coupled control channel, in this example F_c1, will also be re-allocated to the same base station. The invention thus provides for automatic planning of control channels through a method of coupling each control channel to an associated, dedicated traffic channel.

Such a reallocation of a dedicated traffic channel might occur, for example, because of an unacceptably high co-channel interference level from a nearby base station transmitting on the same dedicated traffic channel frequency. Because the interfering neighboring base station uses the same pairing of dedicated traffic channel and associated control channel, it is also likely that there will be an unacceptably high interference on the control channel frequency. In other words, because all control channels in all bases are coupled in the same way to the dedicated traffic channels in the traffic block 60, there is a large correlation between the quality and interference level in the coupled channels. It will also be desirable, therefore, to use the control channel coupled to a newly allocated dedicated traffic channel, because the dedicated traffic channel has been chosen, for example, for its low interference level. Thus, optimizing the dedicated traffic channels in block 60 through the ACA scheme will automatically optimize the control channels in block 50 as well.

Moreover, by basing the channel allocation decisions on measurements of the traffic channels rather than measurements of the control channels, system reliability is enhanced. Because transmission on control channels is bursty and irregular, particularly on the uplink from mobile to base, measurements of the traffic channels provide a more reliable indication on which to base ACA decisions.

Figure 5:
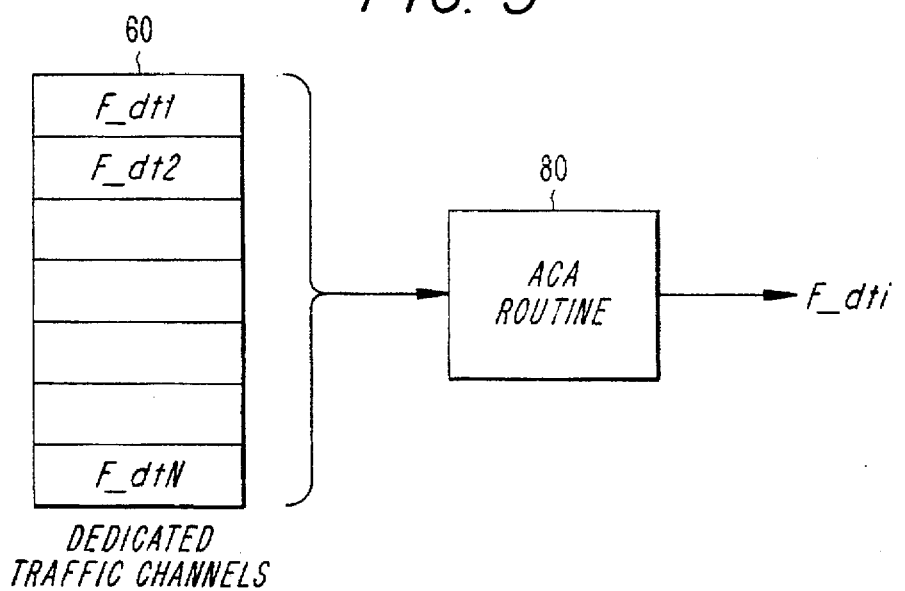
FIG. 5 is a diagram of traffic channel allocation when no dedicated traffic channels are in use.
Figure 6:
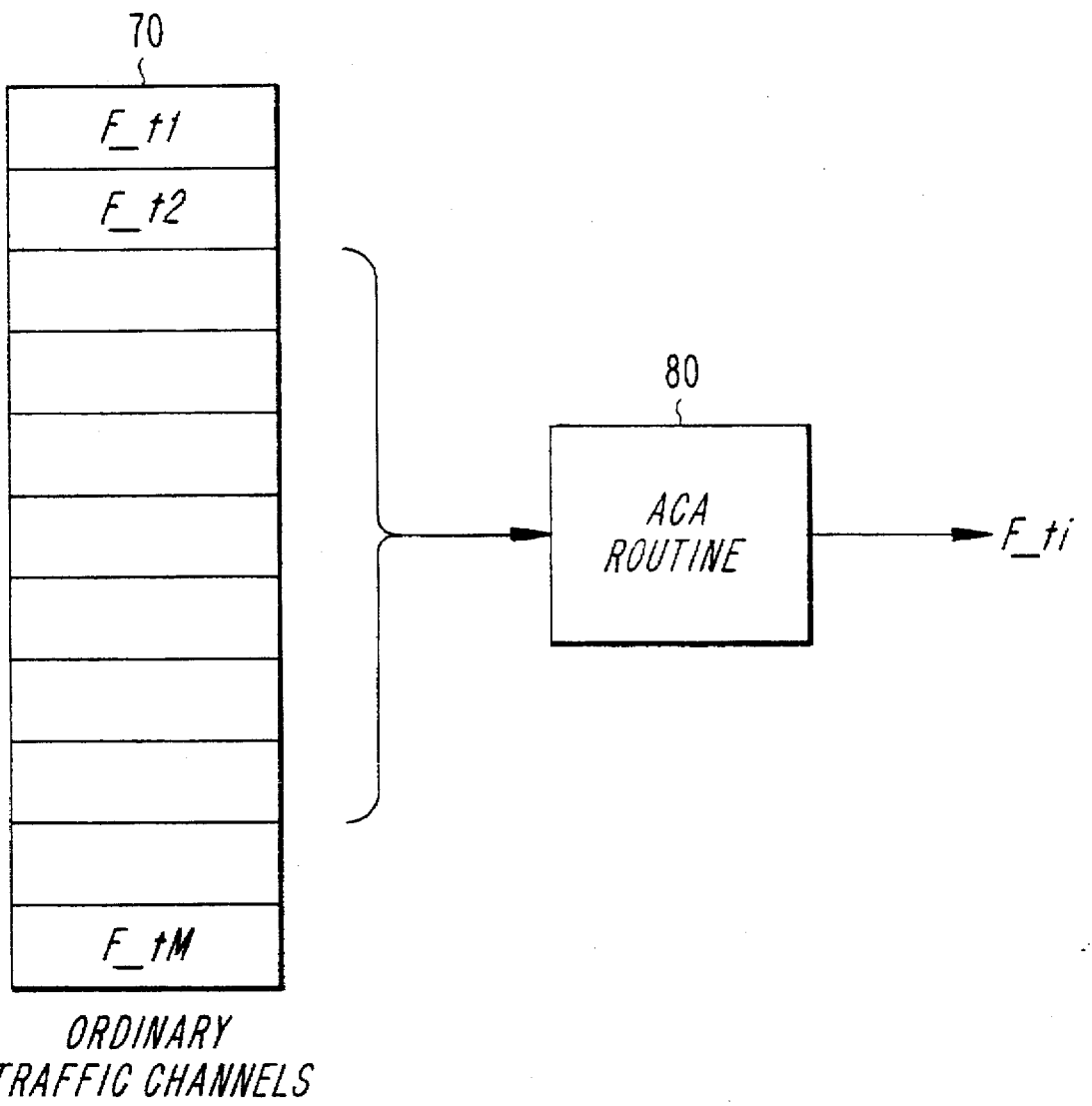
FIG. 6 is a diagram of traffic channel allocation when one dedicated traffic channel is in use.

According to an exemplary embodiment, the invention can reduce the occurrence of changes in control channel allocation by controlling the selection of dedicated traffic channels by the base station. For example, the use of the dedicated traffic channels in block 60 can be restricted such that a base uses only as many dedicated traffic channels from block 60 as it needs control channels. For most of the time, only one control channel per base is required, and therefore a base uses only one of the dedicated traffic channels in block 60. Thus, if none of the dedicated traffic channels is in use at a particular base station, the ACA scheme 80 can select from only the N dedicated traffic channels as a pool, as shown in FIG. 5. On the other hand, if a dedicated traffic channel is already in use at a particular base station, the ACA scheme can select from only the block 70 of M ordinary traffic channels, rather than the dedicated traffic channels, as shown in FIG. 6. However, during peak traffic conditions, additional control channels can be allocated to the base station based on which dedicated traffic channels exhibit a low interference level, and the base can then use the additional coupled dedicated traffic channels. The base also normally uses additional traffic channels from the frequency spectrum which are not in the dedicated traffic block 60.

Due to the restriction discussed above regarding the number of dedicated traffic channels which can be used by a particular base station, the invention can provide a high reuse factor for the dedicated traffic channels of approximately N, the number of control channels. N is 21, for example, in the IS-54 system and 12 in the GSM system, and can be chosen to be sufficiently large to ensure an acceptable level of co-channel interference.

Because the effective reuse factor of the dedicated traffic channels in block 60 is relatively large, there will be few intracell handovers of the dedicated traffic channels. The occasion that a link on the dedicated traffic channel will be reallocated outside of block 60 will also be very infrequent because the dedicated traffic channels generally have a lower co-channel interference than ordinary traffic channels. The high reuse factor can thus provide a stable selection of the dedicated traffic channels, i.e., most of the time, the same dedicated traffic channel is chosen. Therefore, the allocations of the control channels, which are coupled to the dedicated traffic channels, are relatively fixed, and are generally re-allocated, for example, only when the system is reconfigured, or in the event that an additional control channel is needed locally. In such cases, the traffic channel can inform all users of the current control channel where to find the new control channel.

In general, it is desirable for the number of control channels N to be relatively large so that low co-channel interference is assured. Ordinary traffic channels, on the other hand, can have a much lower effective reuse under heavy traffic conditions in an ACA scheme. For example, in the worst case, all bases allocate all traffic channels, in which case the reuse factor is only 1. Thus, since N for the control channels is usually larger than the minimum reuse factor required of the system for all channels including the ordinary traffic channels, an added advantage of the invention is that the dedicated-traffic channels are easy to allocate because of their inherently low co-channel interference, i.e., since the number of dedicated traffic channels allocated to each cell is limited.

In the case of an intercell handover where the user on the dedicated traffic channel moves into another cell, or in the case that the user of the dedicated traffic channel hangs up, another user currently using an ordinary traffic channel served by the base can take the place of the user that left the dedicated traffic block, since at least one control channel should be available per base. This dedicated traffic channel will with high probability have a higher performance than the ordinary traffic channel since it has a high reuse factor.

If there are no other users in the cell to which the dedicated traffic channel can be handed over, a dummy user can be introduced. At any time a control channel should be present in a cell, e.g., for broadcasting cell information, even if temporarily no users are served by this base. When no traffic channels are in use, even no dedicated traffic channels, it is unclear which control channel to allocate for this purpose. Therefore, a dummy user can be introduced. This allows the system to have a channel ready in case a request is made. The channel allocated to the dummy user does not have to be active, but it is preferably treated by the ACA routine as a channel that would be allocated when a new, real user becomes active. As soon as a call is made, the dummy user changes into a real user. During the time when there are no users, the environment may change. The ACA scheme can still anticipate this by continuously monitoring the channels. Each time it can select the best dedicated traffic channel which will be used if a call were to be requested. However, as long as no call comes in, this process can also be regarded as serving a dummy user.

The foregoing description focuses on characteristics of the present invention. Those skilled in the art will readily appreciate that the present invention is applicable to any ACA scheme, that is adaptive channel allocation based upon any quality criteria selection scheme. Although these exemplary embodiments assume a fixed set of frequencies allocated for control channel usage (e.g., the 21 control channels allocated for AMPS and IS-54), those skilled in the art will recognize that the present invention is also applicable to systems in which the control channel frequencies are not fixed. For example, the digital control channel (DCC) scheme in IS-136 allows a digital control channel to be allocated anywhere in the spectrum. However, since each carrier that supports a DCC also supports two traffic channels in the three slot IS-136 TDMA scheme, one of these traffic channels can be coupled to the DCC on the shared carrier.

Moreover, while the illustrative embodiments have been described in terms of mobile stations and cellular systems generally, it will be understood that the present invention is applicable to any type of wireless remote device (e.g., PCS, PDA, modems, data terminals, portable units) and any type of system (e.g., satellite transmission system, hybrid satellite and land-based transmission system, indoor system, etc.).

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for allocating control channels in radio communication system comprising steps of:

providing a plurality of traffic channels in said radio communication system;

providing a plurality of control channels in said radio communication system;

associating a first of said plurality of traffic channels with a first of said plurality of control channels and a second of said plurality of traffic channels with a second of said plurality of control channels; and allocating said first of said plurality of traffic channels and said first of said plurality of said control channels to said base station in said radiocommunication system.

2. Handing over a connection on said first of said plurality of traffic channels to said second of said plurality of traffic channels; and allocating said second of said plurality of control channels associated with said second of said plurality of traffic channel to said base station.

3. The method of claim 1, further comprising the step of:

associating said second of said plurality of traffic channels with said second of plurality of control channels; and allocating said second of said plurality of traffic channels and said second of said plurality of control channels to said base station.

4. A method for allocating channels in a radiocommunication system which includes a plurality of traffic channels and a plurality of control channels comprising the steps of:

designating said plurality of traffic channels as one of dedicated traffic channels and undedicated traffic channels;

associating each of said control channels with one of said dedicated traffic channels;

allocating a dedicated traffic channel to a cell; and allocating a respective associated control channel to said cell.

5. The method of claim 4, wherein said first step of allocating further comprises the step of:

allocating said dedicated traffic channel to said cell based upon at least one predetermined quality criteria.

6. In a radiocommunication system having base stations which transmit information on traffic channels and control channels, a method for allocating control channels to the base stations comprising the steps of:

coupling at least one of the traffic channels with one of the control channels;

allocating the traffic channels to the base stations; and allocating the control channels to the base stations based on the allocation of the coupled traffic channels to the base stations.

7. The method of claim 6, wherein the traffic channels are allocated to the base stations using Adaptive Channel Allocation.

8. The method of claim 6, further comprising the step of restricting the number of coupled traffic channels allocated to one of the base stations based on the number of coupled control channels allocated to said one of the base stations.

9. A method for allocating control channels in a radiocommunication system comprising the steps of:

providing a plurality of traffic channels and control channels in said radiocommunication system;

associating at least one of the traffic channels with one of the control channels;

allocating the associated traffic channel to a base station; and allocating the associated control channel to the base station.

10. The method of claim 9, further comprising the steps of:

handing over a connection on said associated traffic channel to a second associated traffic channel; and allocating a second control channel associated with said second associated traffic channel to the base station.

11. The method of claim 9, further comprising the steps of:

allocating a second control channel and a second traffic channel associated with said second control channel to said base station.

12. The method of claim 9, further comprising the steps of:

providing a connection to a user on the associated traffic channel; and handing over a connection on said associated traffic channel to a dummy user if the user hangs up or leaves a cell of the base station.

13. The method of claim 9, further comprising the steps of:

providing a connection to a first user on the associated traffic channel; and handing over a connection on said associated traffic channel to a second user if the first user hangs up or leaves a cell of the base station.

14. A base station in a radiocommunication system comprising:

means for associating each of a plurality of control channels with a traffic channel;

means for selecting one of the associated traffic channels for communication using Adaptive Channel Allocation; and means for selecting one of the control channels for communication based on the selection of the associated traffic channel.

* * * * *